United States Patent
Xu et al.

(10) Patent No.: US 9,696,704 B2
(45) Date of Patent: Jul. 4, 2017

(54) PLUG AND PLAY MOTOR CONTROL SYSTEM

(75) Inventors: Dayin Xu, Shanghai (CN); David D. Brandt, New Berlin, WI (US); David Lee Jensen, Barneveld, WI (US); Wayne H. Wielebski, New Berlin, WI (US); Goulin Zhang, Shanghai (CN); Ping S. Lee, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1069 days.

(21) Appl. No.: 13/458,720

(22) Filed: Apr. 27, 2012

(65) Prior Publication Data
US 2013/0178984 A1    Jul. 11, 2013

(30) Foreign Application Priority Data
Apr. 29, 2011    (CN) .......................... 2011 1 0117529

(51) Int. Cl.
G05B 19/00    (2006.01)
G05B 19/418    (2006.01)

(52) U.S. Cl.
CPC ......... G05B 19/00 (2013.01); G05B 19/4185 (2013.01); G05B 2219/31131 (2013.01); G05B 2219/31348 (2013.01)

(58) Field of Classification Search
CPC ................ G05B 19/00; G05B 19/4185; G05B 2219/31348; G05B 2219/31131
USPC ...................................... 700/17, 19, 83, 275
See application file for complete search history.

(56) References Cited

U.S. PATENT DOCUMENTS

| | | |
|---|---|---|
| 6,179,644 B1 | 1/2001 | Adams et al. |
| 6,522,944 B2 | 2/2003 | Wielebski et al. |
| 6,701,214 B1 | 3/2004 | Wielebski et al. |
| 7,034,662 B2 | 4/2006 | Brandt et al. |

(Continued)

FOREIGN PATENT DOCUMENTS

| | | |
|---|---|---|
| CN | 2636499 Y | 8/2004 |
| CN | 1658347 A | 8/2005 |

(Continued)

OTHER PUBLICATIONS

Singapore Examination Report for Application No. 2011013265 mailed on Mar. 10, 2015.

(Continued)

Primary Examiner — Christopher E Everett
(74) Attorney, Agent, or Firm — Fletcher Yoder, P.C.

(57) ABSTRACT

A motor control system is provided that includes a communication gateway that facilitates connection of components, such as a motor starter, an operator interface, and a terminal block, through a digital communication link. The communication gateway includes control logic designed to discover interface and operational components connected to the digital communication link upon start-up of the motor control system. The control logic may then set up an operational profile for the motor control system based on the discovered components. For example, the control logic may retrieve and load an operational profile that corresponds to the set of discovered components from a storage of the communication gateway. The operational profile can then be used during operation of the motor control system to govern the functionality of the motor control system.

23 Claims, 4 Drawing Sheets

(56) References Cited

U.S. PATENT DOCUMENTS

| | | |
|---|---|---|
| 7,043,316 B2 | 5/2006 | Farchmin et al. |
| 7,063,572 B2 | 6/2006 | Brandt et al. |
| 7,116,993 B2 | 10/2006 | Farchmin et al. |
| 7,173,345 B2 | 2/2007 | Brandt et al. |
| 7,272,456 B2 | 9/2007 | Farchmin et al. |
| 7,298,275 B2 | 11/2007 | Brandt et al. |
| 7,437,212 B2 | 10/2008 | Farchmin et al. |
| 7,509,537 B1 | 3/2009 | Jensen et al. |
| 7,525,809 B2 | 4/2009 | Bergmann et al. |
| 7,528,612 B2 | 5/2009 | Gollhardt et al. |
| 7,538,511 B2 * | 5/2009 | Samek ............ 318/588 |
| 7,564,341 B2 | 7/2009 | Brandt et al. |
| 7,602,617 B2 | 10/2009 | Brandt et al. |
| 7,741,958 B2 | 6/2010 | Brandt et al. |
| 2005/0200326 A1* | 9/2005 | Mayhew et al. ............ 318/600 |
| 2007/0129814 A1 | 6/2007 | Dionne |
| 2007/0203590 A1 | 8/2007 | Matsumoto |
| 2008/0137266 A1 | 6/2008 | Jensen et al. |
| 2009/0067110 A1* | 3/2009 | Beyer et al. ............ 361/191 |
| 2010/0153022 A1 | 6/2010 | Chen et al. |
| 2011/0040415 A1 | 2/2011 | Nickerson et al. |
| 2012/0032624 A1* | 2/2012 | Peterson ............ H02P 23/0077 318/479 |
| 2012/0081841 A1 | 4/2012 | Blodorn et al. |
| 2012/0095619 A1* | 4/2012 | Pack ............ G05D 1/0038 701/2 |

FOREIGN PATENT DOCUMENTS

| | | |
|---|---|---|
| CN | 101379577 A | 3/2009 |
| CN | 101978456 A | 2/2011 |
| EP | 2042952 A1 | 4/2009 |
| WO | 2006082140 A1 | 8/2006 |
| WO | 2010000394 A1 | 1/2010 |

OTHER PUBLICATIONS

Chinese Office Action for CN Application No. 201110117529.8 mailed Dec. 2, 2015.

* cited by examiner

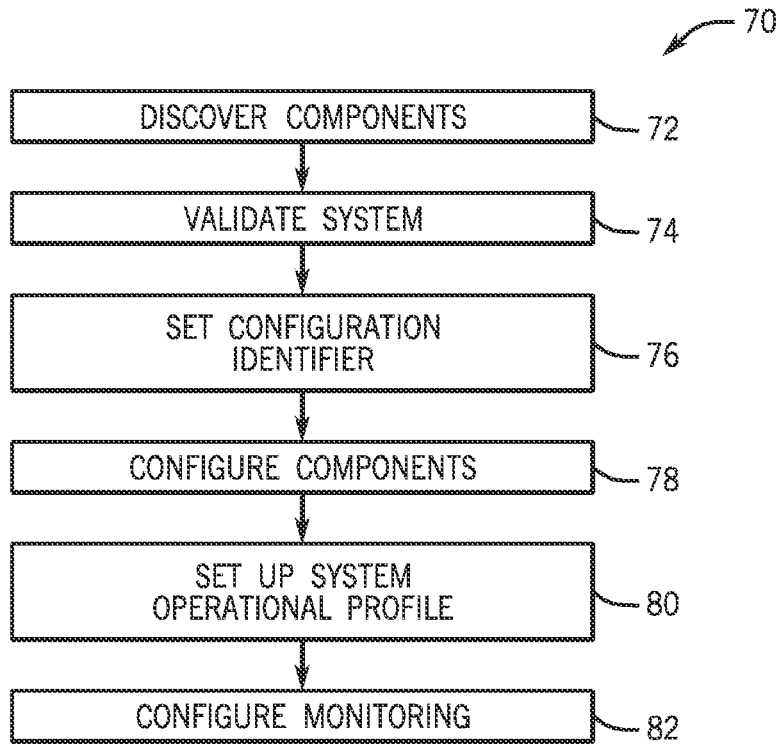
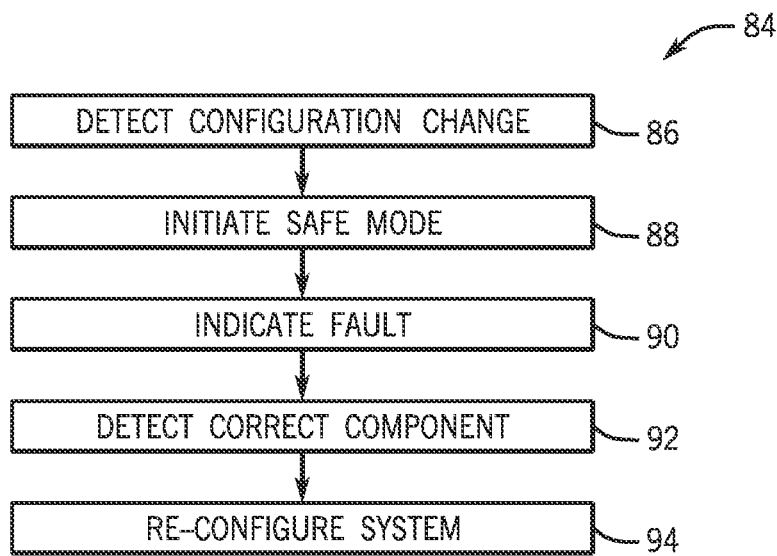

PLUG AND PLAY MOTOR CONTROL SYSTEM

CROSS REFERENCE TO RELATED APPLICATIONS

This application is claims priority to Chinese Patent Application No. 201110117529.8, entitled "PLUG AND PLAY CONTROL SYSTEM," filed Apr. 29, 2011, which is herein incorporated by reference.

BACKGROUND

The invention relates generally to the field of load control systems, such as motor control systems used in industrial and commercial settings. More particularly, embodiments of the present invention relate to motor control systems with plug and play features that facilitate connection of different interface and/or operational components of the motor control system.

Motor control systems, such as motor control centers (MCCs) and standalone cabinets or enclosures, are common throughout a range of industrial and automation applications. In general, motor control systems group a range of equipment for a variety of electric loads, and commonly include switchgear, automation control equipment, and supporting circuits into manageable enclosures that can be positioned at various locations around a controlled machine or process. The enclosures typically include one or more individual compartments or bays that can be accessed through lockable doors. Because the components within MCCs often regulate application of three-phase power to loads, access to the interior of the bays, and routing of data within the motor control systems needs to be specially controlled and adapted for a high voltage environment.

Typically, multiple discrete wires connect components within a motor control system, with separate wires being used to transmit power and different types of data signals to various components within the motor control system. That is, power is distributed over dedicated power wires and data is distributed over dedicated data wires, both of which are disposed in separate protective conduits or cable jackets. Accordingly, a motor control system typically includes numerous discrete wires. Further, motor control systems generally include one or more operator interfaces disposed in the lockable doors to facilitate user monitoring and/or control of the motor control system. Consequently numerous discrete wires often extend within an enclosure between components located within the enclosure and the interface components located in the enclosure door. The numerous discrete wires can complicate maintenance tasks, cause delays in installation time, and make reconfigurations of the system difficult. Accordingly, it is now recognized that there is a need for improved connectivity solutions between components within a motor control system.

BRIEF DESCRIPTION

The present invention provides a novel approach to connecting components within a motor control system and configuring the motor control system. In particular, the present invention provides a communication gateway component that facilitates connection of components, such as a motor starter, an operator interface, and a terminal block, through a digital communication link. The digital communication link employs digital communication cables that allow multiple types of data to be transmitted over a single cable. Accordingly, in certain embodiments, a single data cable can be employed to connect the operator interface to the communication gateway component, and a single data cable can be employed to connect each of several components (e.g., the motor starter) to the communication gateway component. Further, in certain embodiments, the data cables can be connected to components using receptacle connections that do not require the use of a tool, such as a screwdriver. In certain embodiments, the cables can be combination cables that transmit both data and power. However, in other embodiments, separate power cables and/or wires may be employed within the motor control system.

The motor control system includes control logic designed to discover components connected to the digital communication link upon start-up of the motor control system. For example, a controller may execute the control logic to retrieve identification data stored on individual operator interface components, such as push buttons, selector switches, and pilot lamps, among others, or on an operator interface module, such as a push button station, that includes a set of operator interface components. Further, the controller may execute the control logic to retrieve identification data stored on the operator interface that represents the operator interface components connected to the operator interface. In another example, the controller may execute the control logic to retrieve identification data stored on individual operational components, such as circuit breakers, relays, and drives, among others, or to retrieve identification data stored on the terminal block that represents the operational components connected to the terminal block. Further, the controller may execute the control logic to retrieve identification data stored on an integrated set of operational components, such as a motor starter. The controller may then set up an operational profile for the motor control system based on the discovered components. For example, the controller may retrieve and load an operational profile that corresponds to the set of discovered components from a storage feature of the communication gateway. The operational profile can then be used during operation of the motor control system to govern the functionality of the motor control system.

DRAWINGS

These and other features, aspects, and advantages of the present invention will become better understood when the following detailed description is read with reference to the accompanying drawings in which like characters represent like parts throughout the drawings, wherein:

FIG. 3 is a flow chart of a method for automatically configuring the motor control system of FIG. 1 in accordance with the present techniques;

FIG. 4 is a flow chart of a method for replacing a component in the motor control system of FIG. 1 in accordance with the present techniques.

DETAILED DESCRIPTION

Figure 1:
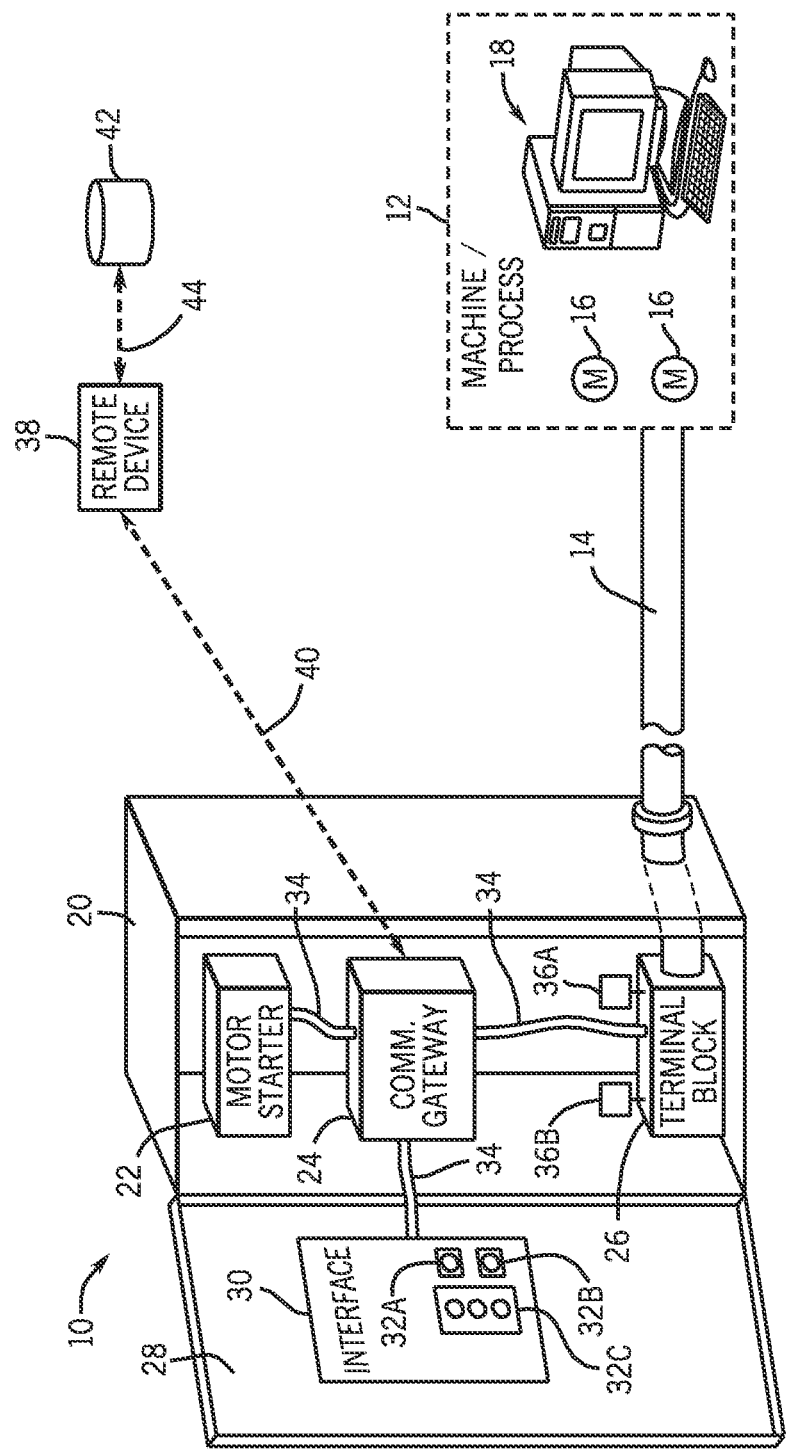
FIG. 1 is a diagrammatical representation of an embodiment of a motor control system that includes plug and play features in accordance with the present techniques.

FIG. 1 depicts an embodiment of a load control system, such as a motor control system 10 that includes plug and play features that facilitate connection of different interface components and/or operational components to the motor control system 10. The motor control system 10 can be employed to control and monitor a machine/process 12. As shown in FIG. 1, the motor control system 10 generally represents a motor control center (MCC) that houses a number of components of the machine/process 12, such as switching and protection devices. However, in other embodiments, the motor control system 10 may represent any system that controls multiple component motor applications, such as a stand alone motor control cabinet for an industrial process (e.g., a conveyer line), or a centralized motor control cabinet that controls several motors. Further, although the present techniques are described herein in the context of a motor control system, it should be appreciated that the present techniques are applicable to any suitable load control system, such as a load control system for controlling heater loads, ovens, a hydraulic load, or a valve system, among others.

The motor control system 10 transmits data and power to the machine/process 12 through a cable 14. In general, the motor control system 10 can be employed to switch, protect, and/or control one or more motors 16 of the machine/process 12. Data from the motor control system 10 also may be provided to a control/monitoring station 18 to facilitate control and/or monitoring of the machine/process 12. According to certain embodiments, the control/monitoring station 18 may be part of a distributed control system (DCS), a field station, and/or may be a remote programmable logic controller (PLC). The control/monitoring station 18 may include a user interface that displays the status of the motor control system 10 and, in certain embodiments, also may receive user inputs for controlling the motor control system 10 and/or the machine/process 12.

The machine/process 12 may take many forms and may include devices for accomplishing many different and varied purposes. For example, the machine/process 12 may comprise a compressor station, an oil refinery, a batch operation for making food items, a mechanized assembly line, and so forth. Accordingly, the machine/process 12 may include a variety of operational components, such as the motors 16, valves, actuators, temperature elements, and pressure sensors, for a myriad of manufacturing, processing, and/or material handling applications, among others.

The motor control system 10 includes an enclosure 20 that houses a load controller, such as a motor starter 22. The enclosure 20 also houses a communication gateway 24 and a terminal block 26. The motor starter 22 can be employed to govern operation of the motors 16 within the machine/process 12, and the terminal block 26 can allow additional devices and/or components to be connected to the motor control system 10. For example, the terminal block 28 can be connected to the control/monitoring station 18 through discrete wires. The motor control system 10 includes a door 28 that is coupled to the enclosure 20. During operation, the door 28 may be closed and/or latched to restrict access to high-voltage components within the enclosure 20. For example, the motor control system 10 may receive 3-phase power that is distributed throughout the enclosure 20 using wireways or power buses. The power may then be distributed to the machine/process 12 through the cable 14. The door 28 houses an operator interface 30 that can be used by an operator to control and/or monitor the motor control system 10. When the door 28 is closed, the operator interface 30 may be accessible by an operator through the exterior of the enclosure 20 to allow monitoring and/or control of the motor control system 10.

Although only one door 28 is shown in FIG. 1, in other embodiments, the motor control system 10 may include a plurality of bays, each housing their own components 22, 24, and/or 26 and having a separate door with an operator interface 30. Further, in certain embodiments, multiple motor starters 22, communication gateways 24, and/or terminal blocks 26 may be disposed within the enclosure 20. Moreover, in certain embodiments, the door 28 may include multiple operator interfaces 30.

The operator interface 30 includes one or more interface components 32A, 32B, and 32C. As shown in FIG. 1, interface components 32A and 32B represent individual interface components, such as push buttons, selector switches, pilot lamps, or combinations thereof, among others. Interface component 32C represents an operator interface module, such as a push button station or light tower, that integrates several interface components into a module that can be installed into the door 28 as a single component. The operator interface 30 can be employed by a user to control the motor starter 22 and may indicate the operational state of the motor starter 22. For example, a user may actuate a push button or a switch to engage the motor starter 22. In another example, one or more pilot lamps may be illuminated to indicate an operational state of the motor starter 22. The interface components included within the operator interface 30 may vary depending on the desired functionality of the motor control system 10 and the other components included within the motor control system 10. Any combination of individual interface components 32A and 32B and operator interface modules 32C can be included within operator interface 30. Further, in certain embodiments, the operator interface 30 may include only individual components 32A and 32B or only interface modules 32C.

The communication gateway 24 provides a motor control application interface that facilitates the plug and play features of the motor control system 10, as discussed further below with respect to FIG. 2. The communication gateway 24 also provides an interface for communication between the motor starter 22, the terminal block 26, and the operator interface 30. In particular, the communication gateway 24 is connected to the motor starter 22, the terminal block 26, and the interface 30 by digital communication cables 34, such as low-level digital communication cables. According to certain embodiments, the cables 34 may be multiple point-to-point cable connections, such as IO link cables, multi-drop communication cables, such as DeviceNet cables employing a backchannel protocol, or daisy-chain cables, such as daisy-cable PointBus cables, or a combination thereof. Further, in certain embodiments, the digital communication cables 34 may be connected using a common backplane, such as a PointBus backplane. The cables 34 may employ low-level, digital communication technology to transfer data between the communication gateway 24, and the motor starter 22, the operator interface 30, and the terminal block 26.

As shown in FIG. 1, the communication gateway 24 is connected to each of the motor starter 22, the operator interface 30, and the terminal block 26 though a separate digital communication cable 34. However, in other embodiments, one or more of the cables 34 may be replaced by discrete wiring that connects the component 22, 26, and/or 30 to the communication gateway 24. For example, in certain embodiments, the motor starter 22 may be discretely hardwired to the communication gateway 24, rather than employing a low-end digital communication cable 34. In these embodiments, the motor starter 22 may include several inputs and outputs that can be connected to the communication gateway 24 by discrete wiring. In another example, the communication gateway 24 may be discretely hardwired to the terminal block 24 rather than employing a digital communication cable 34. Further, in certain embodiments, the motor starter 22 and the communication gateway 24 may be integrated together within a single component.

The terminal block 26 can be connected to operational components 36A and 36B that provide protection, power, and/or control within the motor control system 10. For example, the operational components 36A and 36B may include power protection and switching components, such as fuses, circuit breakers, overload relays and contactors and so forth. Further, the operational components 36A and 36B may include control components, such as automation controllers, motor starters, motor controllers, and drives, that are interconnected with other components to provide the desired control. The operational components 36A and 36B can be connected to terminal block 26 via discrete wiring or via a communication link 34, as discussed further below with respect to FIG. 2. Further, in other embodiments, the operational components 36A and 36B may be connected directly to the communication gateway 24 via discrete wiring or via a communication link 34.

As described further below with respect to FIG. 2, the communication gateway 24 can include logic that facilitates the discovery of the components 32A, 32B, 32C, 36A, and 36B that are connected to the operator interface 30 and the terminal block 26. According to certain embodiments, the communication gateway 24 may include a DeviceNet™ starter auxiliary (DSA) device that includes DeviceLogix™, commercially available from Rockwell Automation, of Milwaukee, Wis.

The communication gateway 24 also may communicate with a remote device 38 through a network connection 40. The network connection 40 may be any suitable wired or wireless network connection 40. According to certain embodiments, the network connection 40 may be part of an industrial communication network, such as a DeviceNet, ControlNet, EtherNet/IP, Profibus, or Modbus network, among others. Further, the motor control system 10 may be coupled to other equipment and/or processes through the network connection 40.

According to certain embodiments, the remote device 38 may be an operator workstation, a computer terminal, or may be part of a DCS or a field station, among others. For example, the remote device 38 may be employed to provide control and/or monitoring of the motor control system 10 and/or the machine/process 12, as well as components of the motor control system 10, such as the operator interface 30, the motor starter 22, and the terminal block 26, among others. According to certain embodiments, the remote device 38 may be a remote PLC that provides additional control and/or functionality for the motor control system 10. For example, in certain embodiments the remote PCL may be connected to multiple motor control systems 10 and may govern operation of a system of motor control systems 10. In these embodiments, the plug and play logic and the communication gateway may facilitate integration of the motor control system 10 into the overall system controlled by the remote PLC.

The remote device 38 also may be another motor control system. In these embodiments, the communication gateway 24 may facilitate peer-to-peer communication between motor control systems 10 that can be connected through the network connection 40. Further, logic within the motor control system 10 can allow the motor control system 10 to send information to, and receive information from, other motor control systems connected to the motor control system 10 through the network connection 40. According to certain embodiments, the motor control system 10 may function as the master device that governs operation of the other motor control systems connected through the network connection 40. In these embodiments, the master control logic may be included within the communication gateway 24, or within another component of the motor control system 10, and an external PLC may not be needed to control multiple motor control systems. Further, in yet other embodiments, the motor control system 10 may be a stand-alone system, and the network connection 40 and the remote device 38 may be omitted.

The remote device 38 may include a user interface that displays the status of the motor control system 10, and in certain embodiments, also may receive user inputs for controlling the motor control system 10 and/or the machine/process 12. For example, the remote device 38 may be equipped with software that allows editing of the logic included within the communication gateway 24. For example, in certain embodiments, the remote device 38 may be an IntelliCenter monitor equipped with RSNetWorx software that employs a DeviceLogix editor. The remote device 38 may be employed to program logic within the communication gateway 24, download logic to the communication gateway 24, monitor the motor control center 10 and/or provide diagnostics. Further, in certain embodiments, the remote device 38 may be employed to configure the motor starter 22 and/or the operator interface 30. Moreover, the remote device may be employed to view the executed logic and check the applied configuration of the motor control system 10 during operation.

The remote device 38 also may be connected to a database 42 through a connection 44, such as a wired or wireless network connection. According to certain embodiments, the database 42 may store logic profiles for the components 32A, 32B, 32C, 36A, and 36B, logic profiles for the operator interface 30, logic profiles for the terminal block 26, and/or operational profiles for the motor control system 10. According to certain embodiments, the remote device 38 may be used to retrieve logic from the database 42 and download the logic to the communication gateway 24.

Figure 2:
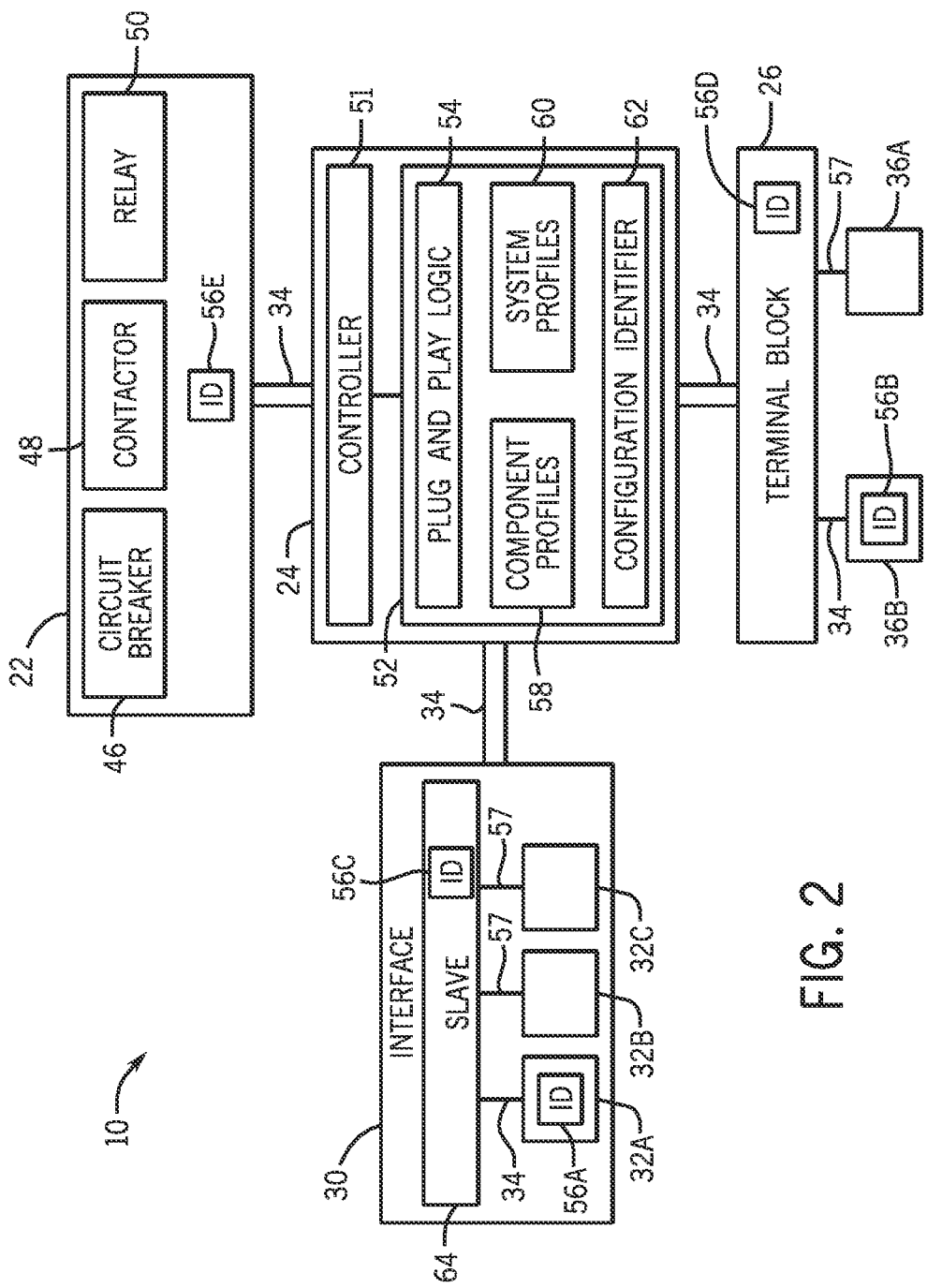
FIG. 2 is a block diagram illustrating components of the motor control system of FIG. 1 in accordance with the present techniques.

FIG. 2 is block diagram illustrating certain components of the motor control system 10 in more detail. As shown in FIG. 2, the motor starter 22 includes a circuit breaker 46, a contactor 48, and an overload relay 50. However, in other embodiments, any suitable type of motor starter 22 may be employed, such as a motor starter that includes a soft starter and drive, among others.

Upon start-up of the motor control system 10, the communication gateway 24 may initiate auto-discovery of the connected components 32A, 32B, 32C, 36A, and 36B, as described further below with respect to FIG. 3. In particular, the communication gateway 24 includes a controller 51 that executes the auto-discovery process. According to certain embodiments, the controller 51 facilitates plug and play functionality of the motor control system 10 by allowing components 32A, 32B, 32C, 36A, and 36B to be connected, discovered, and their functionality determined, without requiring a separate software transaction. The controller 51 may include one or more microprocessors, instruction set processors, analog to digital converters, interface boards, and/or related chip sets, among other components.

The controller 51 may cooperate with a storage 52 that stores executable code, data, and instructions for the controller 51. For example, the storage 52 may store plug and play logic 54 for auto-discovering identification data 56A and 56B included within the components 32A and 36B, as well as identification data 56C, 56D, and 56E included within the operator interface 30, the terminal block 26, and the motor starter 22. In another example, the storage 52 may store values for controlling operation of the motor starter 22. For example, the controller 51 may write data to the storage 52 that represents the status of the motor starter 22. The controller 51 also may read data from the storage 52 and send control signals to the motor starter 22 based on the data. Further, in certain embodiments, the remote device 38 may read and/or write data to the storage 22. The storage 52 may be a non-transitory, tangible, machine-readable media. Further, the storage 52 may include volatile memory, such as random access memory, and/or non-volatile memory, such as read-only memory, flash memory, a hard drive, or any other suitable optical, magnetic, or solid-state computer readable media, as well as a combination thereof.

The plug and play logic 54 can include one or more hardware and/or software control algorithms designed to detect the connected components 32A, 32B, 32C, 36A, and 36B upon start-up of the motor control system 10. For example, the plug and play logic 54 may be designed to read identification data 56A, 56B, 56C, and 56D upon start-up. The identification data 56A is stored within operator interface component 32A, which is connected to a slave adapter device 64 by a digital communication cable 34. The identification data 56B is stored within operational component 36B, which is connected to terminal block 26 by a digital communication cable 34. The connection of the components 32A and 36B to the operator interface 30 and the terminal block 26 via digital communication cables 34 allows the identification data 56A and 56B to be retrieved directly from the components 32A and 36B. According to certain embodiments, the identification data 56A and 56B may be included within the components 32A and 36B upon manufacture, and may be stored, for example, within an EPROM.

The identification data 56C is stored within slave adapter device 64 and may be used to identify the components 32B and 32C that are connected to the slave adapter device 64 by discrete wires 57. Further, in certain embodiments, the identification data 56C may identify the connected components and configuration of the operator interface 30, and identification data 56A may not be employed during the auto-discovery process. The identification data 56D is stored within terminal block 26 and may be used to identify the component 36A, which is connected to the terminal block 26 through a discrete wire 57. In certain embodiments, the identification data 56D may identify the connected components and configuration (i.e. the number of inputs and outputs) of the terminal block 26, and the identification data 56B may not be employed during the auto-discovery process. The motor starter 22 also can include identification data 56E that can be used to identify components, such as the circuit breaker 46, the contactor 48, and the relay 50, that are included within the motor starter 22. According to certain embodiments, the identification data 56C, 56D, and 56E can be included in the slave adapter device 64, the terminal block 26, and the motor starter 26 upon manufacture or can be set in the field, for example, using a DIP switch, or by programming through the remote device 38. Moreover, in certain embodiments, the terminal block 26 and the motor starter 22 also may include a slave adapter device that stores the identification data 56D and 56E.

The storage 52 also stores component profiles 58 that include component logic used to determine the functionality of the connected components 32A, 32B, 32C, 36A, and 36B. For example, according to certain embodiments, logic for the interface components 32A, 32B, and 32C may determine the functionality of the interface components, for example, the conditions under which a pilot lamp is illuminated or flashed. The controller 51 may be employed to write the logic included in the corresponding component logic profiles 58 to the components 32A and 36B upon start-up. The logic may then be stored within the components 32A and 36B and executed by the components 32A and 36B during operation of the motor control system 10. Further, the controller 51 may be employed to write the logic included in the corresponding component logic profiles 58 to the operator interface 30 and the terminal block 26 for the components 32B, 32C, and 36A that are hardwired to the operator interface 30 and the terminal block 26. The logic may then be stored within the operator interface 30 and the terminal block 26.

The plug and play logic 54 also can include one or more hardware and/or software control algorithms designed to automatically load an operational profile 60 for the motor control system 10 based on the discovered components 32A, 32B, 32C, 36A, and 36B. The operational profiles 60 are stored within the storage 52 and include logic that can be executed to determine the overall functionality and operation of the motor control system 10. For example, each operational profile 60 may determine a functionality of the motor control system 10 that corresponds to a specific set of discovered components 32A, 32B, 32C, 36A, and 36B. The plug and play logic 54 can be designed to select an operational profile 60 based on the discovered components 32A, 32B, 32C, 36A, and 36B. The selected operational profile 60 can then be loaded within the controller 51 and the logic of the operational profile 60 can be executed to operate the motor control system 10. Further, in certain embodiments, the selected operational profile 60 and/or the identification data 56A, 56B, 56C, and/or 56D may be transmitted to the remote device 38 to facilitate monitoring of the motor control system 10. For example, in certain embodiments, the identification data 56A, 56B, 56C, and/or 56D may be employed by the remote device 38 to generate a graphical representation of the motor control system 10.

The storage 52 also can store a system configuration identifier 62 that identifies the specific set of discovered components 32A, 32B, 32C, 36A, and 36B. According to certain embodiments, the system configuration identifier 62 may be a combination of numbers and/or letters that represents the set of discovered components 32A, 32B, 32C, 36A, and 36B. For example, the configuration system identifier 62 may be a product catalog number that indicates a specific set of components 32A, 32B, 32C, 36A, and 36B that are interconnected within the motor control system 10. The configuration identifier 62 can then be employed by the controller 51 to determine the correct replacement part within a failed system, as described further below with respect to FIG. 4. According to certain embodiments, the controller 51 also may provide additional functionality within the motor control system 10, such as allowing delayed start-up and/or stopping of the motors 16, or providing local prognosis and/or diagnostic functionality, such as enabling over-temperature and over-current indicators.

The operator interface 30 includes a slave adapter device 64 that allows multiple point-to-point communication channels to be employed in connection with the communication cable 34. According to certain embodiments, the slave adaptor device 64 may be an IO Link slave adapter. However, in other embodiments, any suitable adapter may be employed to facilitate communication between the communication gateway 24 and the operator interface 30. Further, in certain embodiments, the terminal block 26 and the motor starter 22 may include a similar slave adaptor device that facilitates communication between the communication gateway 24 and the terminal block 26 and the motor starter 22. As noted above, communication may occur between the communication gateway 24 and the operator interface 30, the terminal block 26, and the motor starter 22 through a multiple point-to-point communication link, a multi-drop communication network, a daisy-chain communication network, or a common backplane, among others.

Moreover, in certain embodiments, for example, where a multi-drop communication network (e.g., DeviceNet) is employed, the plug and play logic 54 may include an auto-addressing mechanism for undefined components 32A, 32B, 32C, 36A, and/or 36B. For example, if certain components 32A, 32B, 32C, 36A, and/or 36B are connected that do have corresponding identification data 56A, 56B, 56C, or 56D, the plug and play logic 54 may be designed to assign these unidentified components to a default address. Upon detecting multiple components at a default address, the controller 51 may assign a unique address to each of the components 32A, 32B, 32C, 36A, and/or 36B that were previously assigned to the default address. Further, in other embodiments, an indicator or error message may be displayed on the remote device 38 to prompt a user to assign addresses to the unidentified components 32A, 32B, 32C, 36A, and/or 36B.

As shown in FIG. 2, the plug and play logic 54, the component profiles 58, the system profiles 60, and the configuration identifier 62 are stored within the storage 52 of the communication gateway 24. However, in other embodiments, one or more of the plug and play logic 54, the component profiles 58, the system profiles 60, and the configuration identifier 62 may be stored within a storage of the motor starter 22, the operator interface 30, the terminal block 26, the remote device 38, or a combination thereof. Further, in certain embodiments, the communication gateway 24 may be an integral part of the motor starter 22.

FIG. 3 depicts a method 70 for using plug and play features to automatically configure a motor control system 10, in accordance with certain embodiments. The method 70 can be executed using the plug and play logic 54 included within the storage 52. The method 70 may begin by discovering (block 72) components that are connected to the motor control system 10. For example, the controller 51 may execute hardware and/or software control algorithms to retrieve the identification data 56A, 56B, 56C, and 56D (FIG. 2). The controller 51 may then validate (block 74) the system 10 by ensuring that the combination of discovered components 32A, 32B, 32C, 36A, and 36B corresponds to a valid system operational profile 60. For example, as shown in FIG. 2, the controller 51 may compare the set of discovered components 32A, 32B, 32C, 36A, and 36B to the operational profiles 60 included within the storage 52 and ensure that the set of discovered components corresponds to one of the stored operational profiles 60. According to certain embodiments, the operational profiles 60 may be loaded into the storage 52 through the remote device 38 and may be defined by desired customer applications and/or functionalities. Further, in other embodiments, the controller 51 may directly use the identification data 56A, 56B, 56C, and 56D to validate (block 74) the system 10 by ensuring that the combination of retrieved identification data 56A, 56B, 56C, and 56D corresponds to a valid system operational profile 60.

After validating (block 74) the system, the controller 51 may set (block 76) the system configuration identifier 62. As discussed above with respect to FIG. 2, the system configuration identifier 62 may be a combination of numbers and/or letters that represents the set of discovered components 32A, 32B, 32C, 36A, and 36B. To set (block 76) the system configuration identifier 62, the controller 51 may retrieve the system configuration identifier that corresponds to the set of discovered components 32A, 32B, 32C, 36A, and 36B and may store the retrieved system configuration identifier 62 within the storage 52.

According to certain embodiments, the controller 51 may retrieve the system configuration identifier 62 during the validation process. For example, in certain embodiments, each of the system operational profiles 60 may include a corresponding system configuration identifier. In these embodiments, the controller 51 may retrieve the system configuration identifier 62 from the operational profile 60 that corresponds to the discovered set of components and may store the retrieved system configuration identifier 62 in the storage 52. In other embodiments, the controller 51 may use look up tables or algorithms included in the plug and play logic 54 to determine the system configuration identifier 62 that corresponds to the set of discovered components. Further, in other embodiments, the controller 51 may transmit data, such as the component identification data 56, to the remote device 38 to obtain the corresponding system configuration identifier 62. Moreover, in yet other embodiments, the configuration identifier 62 may be input by a user through the remote device 38 or may be set using a dual in-line package (DIP) switch of the communication gateway 24.

The controller 51 may then configure (block 78) the discovered components 32 and 36. For example, the controller 51 may retrieve logic corresponding to the discovered components from the component profiles 58. The controller 51 may then write the logic to the components 32A and 36B, the operator interface 30, and/or the terminal block 26 via the communication cables 34. The logic can then be executed at the component level during operation of the motor control system 10. Further, if certain components 32B, 32C, and 36A are hardwired to the operator interface 30 and the terminal block 26, the controller 51 may assign specific discrete inputs and/or outputs to certain functions associated with the components 32B, 32C, and 36A. For example, the controller 51 may assign certain inputs and/or outputs of the operator interface 30 and the terminal block 26 to certain functions. In another example, if the motor starter 22 is hardwired to the communication gateway 24, the controller 51 may assign certain inputs and/or outputs of the motor starter 22 and/or the communication gateway 24 to certain functions.

The controller 51 also may set up (block 80) the operational profile of the motor control system 10. For example, the controller 51 may retrieve logic included in the system operational profile 60 identified during the validation process. The controller 51 may then load the logic for execution during operation of the motor control system 10. According to certain embodiments, the system logic may specify the functionality of the motor control system 10. For example, the system logic can determine how the motor control system 10 responds to certain events, such as fault conditions. Moreover, the system logic can determine how the motor control system 10 displays operational conditions on the operator interface 30, the remote device 38, and/or the control/monitoring station 18.

In certain embodiments, the controller 51 also may configure (block 82) monitoring of the motor control system 10. For example, in certain embodiments, the controller 51 may transmit the configuration identifier 62 to the remote device 38 and/or the control/monitoring station 18. The remote device 38 and/or the control/monitoring station 18 may then use the configuration identifier 62 to set up a graphical user interface for monitoring the motor control system 10.

Figure 5:
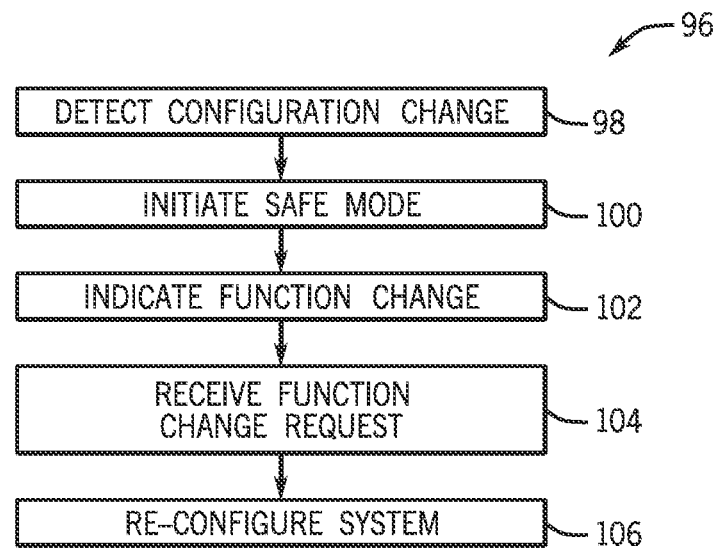
FIG. 5 is a flow chart of a method for changing the functionality of the motor control system of FIG. 1 in accordance with the present techniques.

FIGS. 4 and 5 depict methods that may occur during operation of the motor control system 10. In particular, FIG. 4 depicts a method 84 that may be employed when a component 32 or 36 is replaced within the motor control system 10. According to certain embodiments, the method 84 may ensure that the correct replacement part is connected to the motor control system 10 during maintenance, which may reduce operator error. The method 84 may begin by detecting (block 86) a configuration change. For example, the controller 51 may detect that a different component 32A, 32B, 32C, 36A, or 36B has been connected to the motor control system 10. According to certain embodiments, the controller 51 may compare identification data for the new component to the identification data that is included, or associated with, the configuration identifier 62 and determine that it does not match.

The controller 51 may then initiate (block 88) a safe mode of operation where certain functionalities of the motor control system 10 are disabled. For example, the controller 51 may lock out operation of the motors 16. The controller 51 may then indicate (block 90) that a fault has occurred. For example, one or more lamps, included as components 32 may be illuminated on the operator interface 30. In another example, an error message may be transmitted to the remote device 38 and/or the control/monitoring system 18. The controller 51 may continue to operate the motor control system 10 in the safe mode of operation until detecting (block 92) connection of the correct component. For example, the controller 51 may detect a newly connected component and determine that the corresponding identification data 56 matches the identification data associated with the configuration identifier 62. The controller 51 may then re-configure (block 94) the system. For example, the controller may execute the method 70 shown in FIG. 3 to again discover each of the connected components, validate the system, and setup the system operational profile.

FIG. 5 depicts a method 96 that may be employed when a functionality change is desired for the motor control system 10. For example, a user may wish to replace a connected component 32A, 32B, 32C, 36A, or 36B with a different type of component to change the functionality of the motor control system 10. The method 96 may begin by detecting (block 98) a configuration change. For example, as described above with respect to FIG. 4, the controller 51 may determine that a different type of component has been connected. Further, in other embodiments, a user may input a different configuration identifier 62, for example, through the remote device 38 or by changing a DIP switch of the communication gateway 24.

The controller 51 may then initiate (block 100) a safe mode of operation. For example, the controller 51 may disable certain functions of the motor control system 10. The controller also may indicate (block 102) that a function change has been detected. For example, the controller 51 may display a warning through the operator interface 30, through the remote device 38, and/or through the control/monitoring system 18. The controller 51 may then receive (block 104) a function change request. For example, a user may enter a user input indicating that a function change is desired through the remote device 38, the control/monitoring system 18, or through the operator interface 30.

Upon receiving the function change request, the controller 51 may then reconfigure (block 106) the system to set up the new functionality. For example, the controller may initiate the method 70, described above with respect to FIG. 3. As discussed above with respect to FIG. 3, the controller may discover the connected components, validate the system, and set a new configuration identifier.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A load control system, comprising:
a load controller configured to control an operation of a motor;
a plurality of interface components configured to communicate data to the load controller;
an operator interface configured to receive the plurality of interface components;
a communication gateway component configured to communicatively couple to the load controller and the operator interface through a digital communication link, wherein the communication gateway component comprises:
a controller configured to:
automatically discover an identity of each of the plurality of interface components via the communication gateway upon startup;
identify an operational profile of the load control system from a plurality of operational profiles stored in a storage based on a combination of the identity of each of the plurality of interface components discovered by the controller;
load the operational profile of the load control system from the storage; and
operate the load control system based on the operational profile.

2. The load control system of claim 1, wherein the load controller comprises a motor starter comprising a circuit breaker, a contactor, and a relay.

3. The load control system of claim 1, wherein the plurality of interface components comprise one or more push buttons, selector switches, or pilot lamps, or a combination thereof.

4. The load control system of claim 1, wherein the communication gateway component is an integral part of the load controller.

5. The load control system of claim 1, wherein the controller is disposed within the communication gateway component.

6. The load control system of claim 1, wherein the digital communication link comprises a multiple point-to-point communication link, a multi-drop communication network, or a daisy-chain communication network, or a combination thereof.

7. The load control system of claim 1, wherein the controller is configured to:
retrieve logic that corresponds to the identity of each of the plurality of interface components; and
write the logic, via the digital communication link, to the plurality of interface components, the operator interface, or a combination thereof.

8. The load control system of claim 1, wherein the load controller comprises a motor starter, and comprising an enclosure accessible by a door, wherein the motor starter and the communication gateway component are disposed within the enclosure, and wherein the operator interface is disposed within the door.

9. The load control system of claim 1, comprising a terminal block configured to connect to one or more operational components of the load control system, wherein the controller is configured to:
automatically discover one or more identities of the one or more operational components via the communication gateway component; and
set up the operational profile based on the one or more identities of the one or more operational components.

10. The load control system of claim 9, wherein the one or more operational components comprise one or more circuit breakers, one or more drives, one or more relays, or a combination thereof.

11. The load control system of claim 1, comprising a motor control system, and wherein the communication gateway component is configured to facilitate peer-to-peer communication between the motor control system and one or more additional motor control systems.

12. The load control system of claim 1, comprising a motor control system, wherein the communication gateway component is configured to communicatively couple to a remote programmable logic controller for controlling multiple motor control systems, and wherein the operational profile facilitates control of the motor control system by the remote programmable logic controller.

13. A method comprising:
automatically discovering, via a processor, each of a plurality of identities of a plurality of interface components connected to a load controller through a digital communication link of a load control system upon startup of the load control system, wherein the plurality of interface components is configured to couple to an operator interface for sending data to the load controller, and wherein the load controller is configured to control an operation of a motor control system;
retrieving, via the processor, an operational profile of the motor control system from a storage based on a combination of the each of the plurality of identities of the plurality of interface components discovered by the processor; and
operating, via the processor, the motor control system based on the operational profile.

14. The method of claim 13, wherein the load controller comprises a motor starter and wherein the load control system comprises a motor control system.

15. The method of claim 13, comprising loading, via the processor, the operational profile for execution during operation of the load control system.

16. The method of claim 13, comprising validating the load control system to ensure that the combination of the identify of each of the plurality of interface components identities correspond to a stored operational profile.

17. The method of claim 13, comprising retrieving, via the processor, logic that corresponds to the operational profile and writing the logic to the plurality of interface components via the digital communication link.

18. The method of claim 13, comprising:
assigning, via the processor, a system configuration identifier representative of the identity of each of the plurality of interface components to the load control system; and
initiating, via the processor, a safe mode of operation for the load control system in response to detecting a new identity of the one of the plurality of interface components that does not correspond to the system configuration identifier.

19. The method of claim 18, comprising re-discovering, via the processor, the identity of each of the plurality of interface components in response to receiving a user input indicative of a function change.

20. The method of claim 13, comprising setting up, via the processor, a user interface for monitoring the load control system based on the identify of each of the plurality of interface components.

21. Non-transitory computer-readable storage media comprising instructions stored thereon, wherein the instructions are configured to:
automatically discover a plurality of identities of a plurality of interface components configured to connect to an operator interface for controlling a motor starter through a digital communication link of a motor control system upon startup of the motor control system;
select an operational profile of the motor control system based on a combination of the plurality of identities; and
load the operational profile for execution during operation of the motor control system.

22. The non-transitory computer-readable storage media of claim 21, comprising instructions configured to retrieve logic that corresponds to the plurality of identities and write the logic to the one or more interface components via the digital communication link.

23. The non-transitory computer-readable storage media of claim 21, comprising instructions configured to:
discover one or more identities of one or more operational components connected to a motor starter through the digital communication link of the motor control system; and
select the operational profile of the motor control system based on the one or more identities of the one or more operational components.

* * * * *